United States Patent
Cherepinsky et al.

(10) Patent No.: US 7,931,231 B2
(45) Date of Patent: Apr. 26, 2011

(54) ENGINE ANTICIPATION FOR ROTARY-WING AIRCRAFT

(75) Inventors: Igor Cherepinsky, Sandy Hook, CT (US); Joseph T. Driscoll, Cheshire, CT (US); Stella Jang, Bridgeport, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 579 days.

(21) Appl. No.: 12/026,560

(22) Filed: Feb. 6, 2008

(65) Prior Publication Data

US 2008/0283671 A1 Nov. 20, 2008

Related U.S. Application Data

(60) Provisional application No. 60/938,777, filed on May 18, 2007.

(51) Int. Cl.
*B64C 27/57* (2006.01)

(52) U.S. Cl. ............ 244/17.13; 244/195; 701/3; 416/30

(58) Field of Classification Search ............... 244/17.13, 244/182, 194–195; 701/3, 99; 60/721; 416/27–30
See application file for complete search history.

(56) References Cited

U.S. PATENT DOCUMENTS

| | | | |
|---|---|---|---|
| 3,129,768 A * | 4/1964 | Collins | 416/27 |
| 3,174,284 A * | 3/1965 | McCarthy | 60/791 |
| 3,309,868 A * | 3/1967 | Downing et al. | 60/791 |
| 4,445,421 A | 5/1984 | Walker et al. | |
| 4,466,526 A * | 8/1984 | Howlett et al. | 416/30 |
| 4,645,048 A | 2/1987 | Inoue | |
| 4,648,797 A | 3/1987 | Martin | |
| 4,807,129 A * | 2/1989 | Perks | 701/3 |
| 4,912,642 A * | 3/1990 | Larsen et al. | 701/99 |
| 5,020,316 A | 6/1991 | Sweet et al. | |
| 5,023,793 A | 6/1991 | Schneider et al. | |
| 5,046,923 A | 9/1991 | Parsons et al. | |
| 5,188,511 A | 2/1993 | Ebert | |
| 5,265,825 A * | 11/1993 | Ebert et al. | 244/17.13 |
| 5,265,826 A * | 11/1993 | Ebert et al. | 244/17.13 |
| 5,416,699 A | 5/1995 | Divalentin et al. | |
| 5,983,857 A | 11/1999 | Mamiya et al. | |
| 6,729,138 B2 | 5/2004 | Noussitou et al. | |
| 6,729,139 B2 | 5/2004 | Desai et al. | |
| 6,873,887 B2 | 3/2005 | Zagranski et al. | |
| 6,879,885 B2 | 4/2005 | Driscoll et al. | |
| 6,986,641 B1 | 1/2006 | Desai et al. | |

FOREIGN PATENT DOCUMENTS

JP 2000264296 9/2000

OTHER PUBLICATIONS

International Search Report and written opinion mailed Apr. 28, 2009.

* cited by examiner

*Primary Examiner* — Galen Barefoot
(74) *Attorney, Agent, or Firm* — Carlson Gaskey & Olds PC

(57) ABSTRACT

A flight control system and method which determines an expected power required data in response to a flight control command of the at least one model following control law and utilizes the expected power required data to perform at least one action to control an engine speed.

25 Claims, 4 Drawing Sheets

ENGINE ANTICIPATION FOR ROTARY-WING AIRCRAFT

The present application claims priority to U.S. Provisional Patent Application Ser. No. 60/938,777, filed May 18, 2007.

STATEMENT REGARDING FEDERALLY SPONSORED RESEARCH OR DEVELOPMENT

This invention was made with Government support under W58RGZ-06-D-0045 awarded by The United States Army. The Government has certain rights in this invention.

BACKGROUND

The present invention relates to a fly-by-wire flight control system.

In a rotary-wing aircraft application, engine anticipation may be part of the engine control system to maintain rotor speed within a relatively narrow range in response to demanded torque from the rotary-wing aircraft rotor system. The capability of the engine control algorithm to correctly anticipate changes in power required directly impact rotor speed governor performance.

Conventional engine power anticipation algorithms are of two distinct categories: collective pitch based anticipators and predictive anticipators.

Collective pitch based anticipators are most commonly utilized on current generation rotary-wing aircraft. The engine power anticipation algorithm utilizes changes in collective control displacement as collective pitch change has a significant effect on power required. The collective control position is monitored and fuel flow is adjusted based on collective control displacement. This type of an algorithm is typically implemented via mechanical or electronic feedback. Disadvantageously, collective pitch based anticipator performance may be imperfect since power required depends on a multitude of factors, such as air speed, gross weight, maneuver, etc.

Predictive anticipators are currently under development. This category of engine power anticipation algorithms monitor various states of the aircraft and attempt to predict changes in power required with a neural-network which must be trained on each particular engine and aircraft. Disadvantageously, there are known certification issues with predictive anticipators, since the neural network is not deterministic. To date, no production engine control systems have utilized this type of engine power anticipation algorithm.

SUMMARY

A flight control system according to an exemplary aspect of the present invention includes a first module configured to generate one or more flight control commands based at least upon one or more pilot commands; and a second module configured to determine an expected power required data in response to at least one of the one or more flight control commands and utilizes the expected power required data to perform at least one action to control an engine speed. A method of engine anticipation for a rotary-wing aircraft according to an exemplary aspect of the present invention includes determining an expected power required data in response to a flight control command of at least one model following control law; and utilizing the expected power required data to perform at least one action to control an engine speed.

BRIEF DESCRIPTION OF THE DRAWINGS

The various features and advantages of this invention will become apparent to those skilled in the art from the following detailed description of the disclosed non-limiting embodiment. The drawings that accompany the detailed description can be briefly described as follows:

FIG. 3 is a block diagram of an exemplary module used to implement an engine power anticipation algorithm.

DETAILED DESCRIPTION OF THE EXEMPLARY EMBODIMENT

Figure 1:
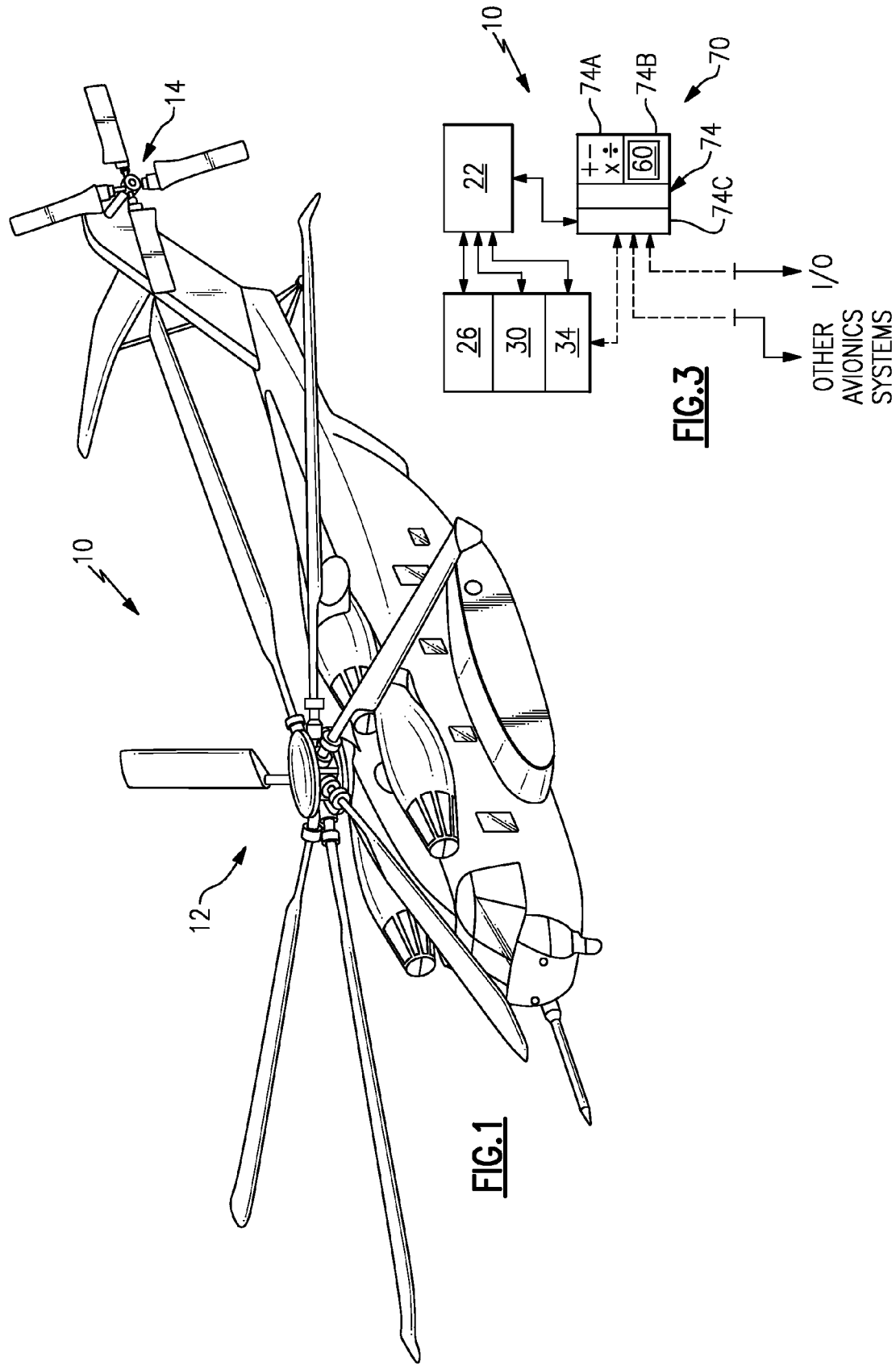
FIG. 1 is a general perspective view of an exemplary rotary wing aircraft embodiment for use with the present invention.

FIG. 1 schematically illustrates an exemplary vertical take-off and landing (VTOL) rotary-wing aircraft 10. The aircraft 10 in the disclosed non-limiting embodiments includes a main rotor system 12 and an anti-torque system 14. Although a particular rotary-wing aircraft configuration is illustrated and described in the disclosed embodiments, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

Figure 2:
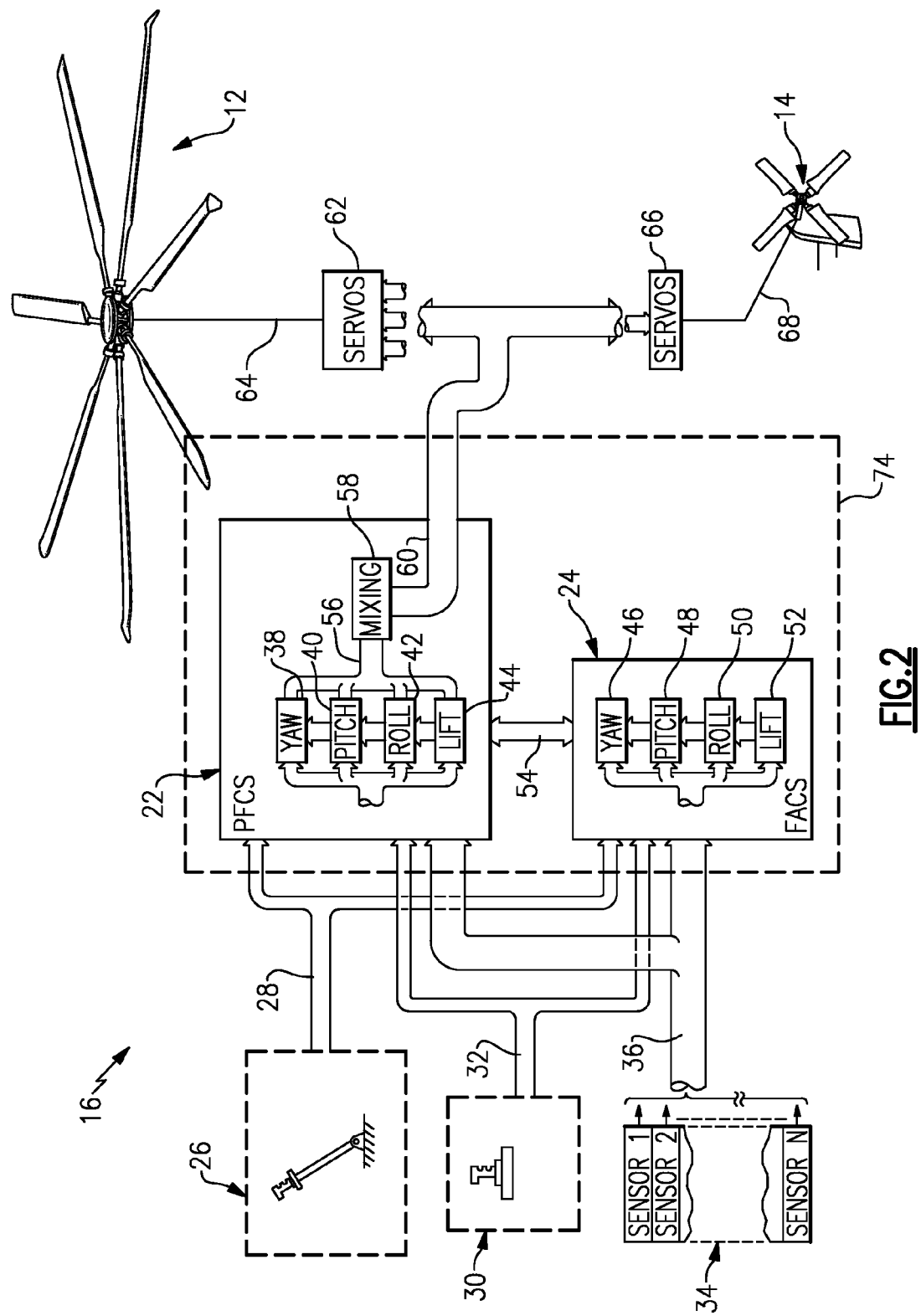
FIG. 2 is a block diagram of an exemplary model following flight control system.

Referring to FIG. 2, a fly-by-wire type flight control system 16 includes a model following control law system which shapes pilot commands through an inverse vehicle model to produce the desired aircraft response. The flight control system 16 includes a Primary Flight Control System (PFCS) 22 and a Flight Augmentation and Cueing System (FACS) 24.

The FACS 24 augments the performance of the PFCS 22. The PFCS 22 and FACS 24 execute model following control laws to provide both control and stability augmentation such that pilot commands are shaped into desired aircraft responses. The desired aircraft responses are then passed through an inverse aircraft model to obtain (e.g., after mixing and kinematics) the flight control commands required to make the aircraft produce an aircraft response. The difference between the desired response and the aircraft response is also fed back to drive these errors towards zero, thus improving the model following performance.

The PFCS 22 and FACS 24 each receive pilot commands of a collective controller 26 on line 28, a cyclic controller 30 on line 32, and the aircraft sensed parameter signals from a sensors suite 34, on line 36. The collective controller 26 and the cyclic controller 30 may take various forms including sidearm controllers, a yaw pedal system or other such flight controllers.

The PFCS 22 and FACS 24 may each contain separate control channel logic laws for controlling the yaw, pitch, roll and collective axes of the aircraft. The logic is included in the PFCS and FACS control modules (schematically represented by blocks 38, 40, 42, 44 for the PFCS and blocks 46, 48, 50, 52 for the FACS). The sensed parameter signals from the sensor suite 34 provide the PFCS and FACS with the aircraft's angular rate and attitude response to the control commands. The PFCS logic provides control command signals and the FACS logic provides conditioning and/or trimming of the PFCS four axis logic functions. The PFCS and FACS logic modules interconnect through bus 54 to provide rotor command signals on output lines 56 to a mixing function 58 which communicates commands on line 60 for the displacement of servos 62 and linkages 64 to control the tip path plane of the main rotor 12. A mixed command signal is also provided on line 60 to the tail rotor servos 66 which control the thrust of the anti-torque system 14 through linkages 68.

Referring to FIG. 3, a module 70 which performs an engine power anticipation algorithm 72 (see also FIG. 4) is schematically illustrated in a block diagram format. The algorithm 72 is the scheme by which the decisions are made in the disclosed non-limiting embodiments. The module 70 may be, e.g., microprocessor based. In one non-limiting embodiment, the module 70 may be a portion of a fight control computer (FCC) 74 of the flight control system 16 (see also FIG. 4). Although the FCC 74 is schematically illustrated as a block, it should be understood that the FCC 74 herein may include multiple computers having multiple channels and multiple redundant subsystems.

The FCC 74 typically includes a processor 74A, a memory 74B, and an interface 74C for communicating with the collective controller 26, the cyclic controller 30, the sensor suite 34, and other avionics systems. The memory 74B may, for example only, include random access memory (RAM), read only memory (ROM), or other electronic, optical, magnetic, or any other computer readable medium onto which is stored the data and control algorithms described herein.

Figure 4:
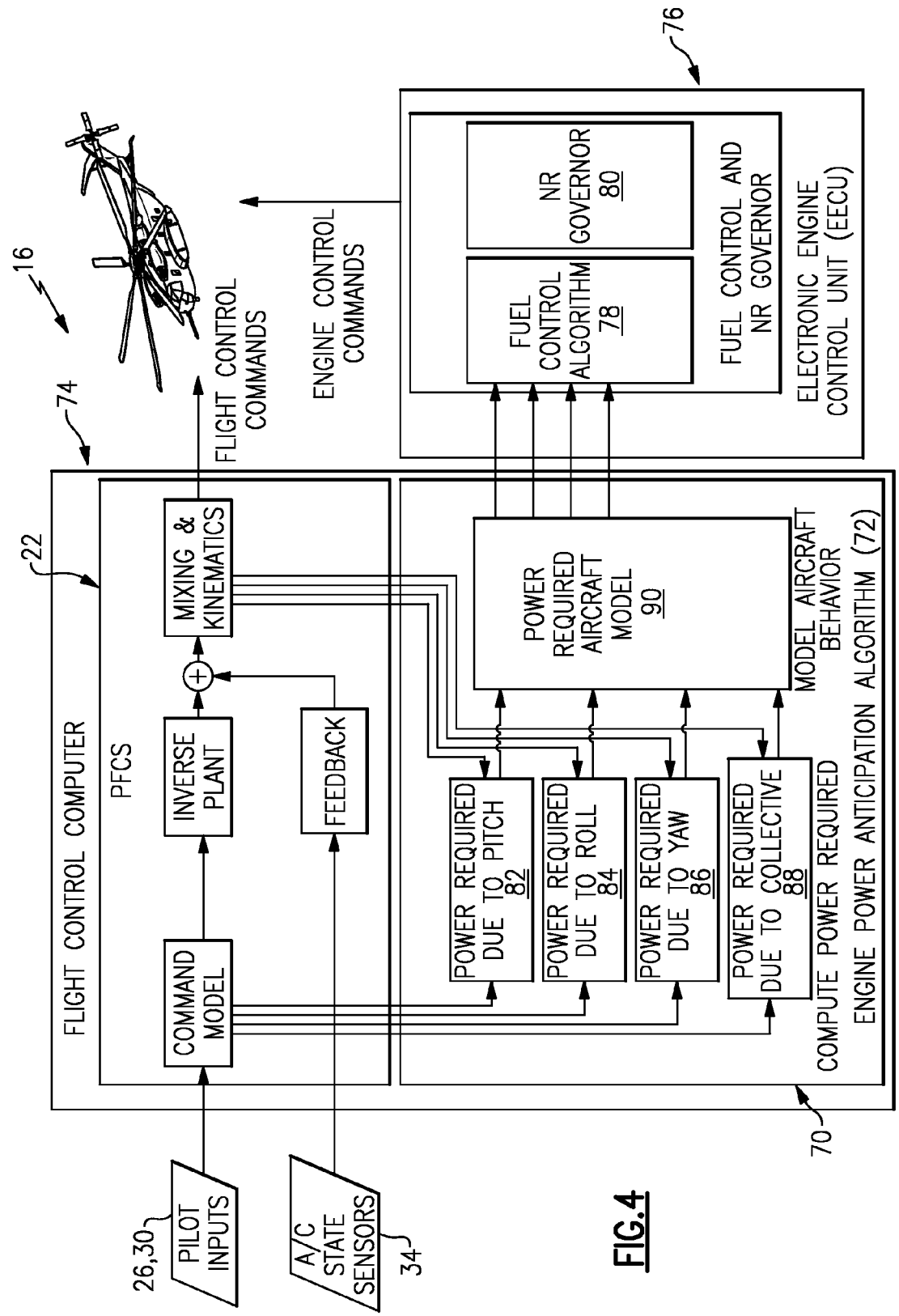
FIG. 4 is a block diagram of an exemplary flight control system with an engine power anticipation algorithm.

Referring to FIG. 4, the module 70 is schematically illustrated in a block diagram format as part of the FCC 74. The module 70 communicates with, in an exemplary embodiment, the model following control law system of the PFCS 22 to execute the engine power anticipation algorithm 72 within the FCC 74. The FCC 74 is in communication with an Electronic Engine Control Unit (EECU) 76 which may be remotely located from the FCC 74 at each engine package. Each EECU 76 may be a digital electronic control unit such as Full Authority Digital Engine Control (FADEC) electronically interconnected to the corresponding engine package. The EECU 76 includes a fuel flow control 78 which controls a rotor speed (NR) governor 80.

The engine power anticipation algorithm 72 addresses rotary-wing aircraft engine anticipation by shaping the "future." That is, since "predicting the future" may be difficult, the engine power anticipation algorithm 72 operates in an essentially opposite manner to use flight commands that have already been shaped by the command model. The engine power anticipation algorithm 72 provides specific rotor control shaping. Since the fly-by-wire system 16 includes specific model-following control logic for each axis within the PFCS 22, the engine power anticipation algorithm 72 has all the information available to compute expected power required. Furthermore, the PFCS 22 has this information a fraction of the second prior to application of these inputs which provides a sufficient time lead for the engine power anticipation algorithm 72 to generate the engine control commands.

The engine power anticipation algorithm 72 utilizes the output of the command model (to the algorithm 72) and the output of the inverse plant (through the mixing and kinematics to the algorithm 72) of the PFCS 22 to estimate power required to maintain a reference rotor speed (such as, for example, 100% rotor speed), when the flight control commands are applied to the main rotor system 12. Due to the nature of any model-following control system, there is an inherent delay from the time that the model following control law system of the PFCS 22 computes the desired angular rates, through the time that the commands suitable for creating the desired angular rates are applied to the flight controls, and ending at the resultant actual aircraft response.

Figure 5:
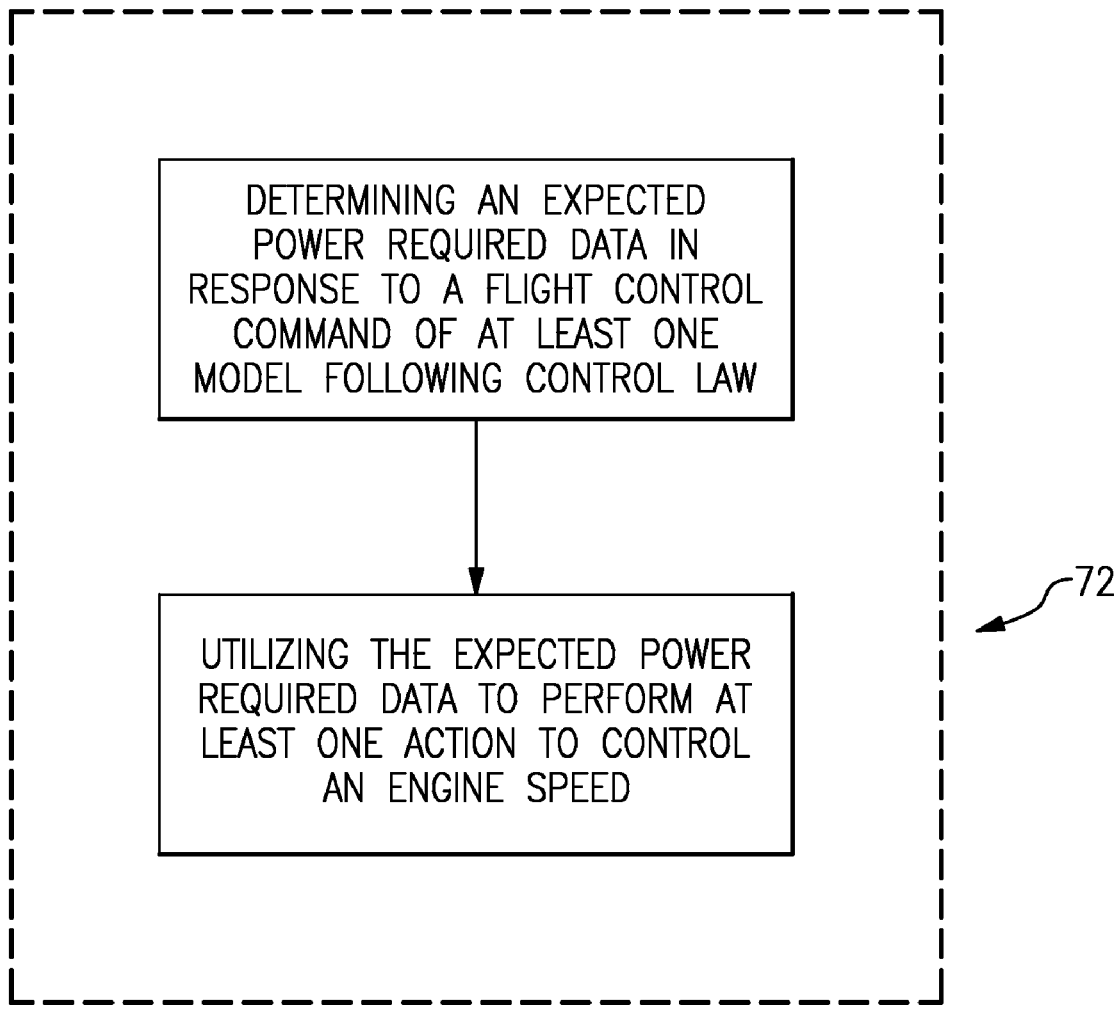
FIG. 5 is a flowchart illustrating operation of the engine power anticipation algorithm.

The engine power anticipation algorithm 72 utilizes this delay to compute expected engine power required data. The engine power anticipation algorithm 72 determines the expected power required for each control channel logic law in the pitch 82, roll 84, yaw 86 and collective 88 axes of the aircraft, for communication to the EECU 76 through a power required aircraft model 90. The power required aircraft model 90 shapes and times the expected engine power required data form each control channel logic law in the pitch 82, roll 84, yaw 86 and collective 88 axes to the specific aircraft type. That is, the power required aircraft model 90 correlates the flight control channel logic law in the pitch 82, roll 84, yaw 86 and collective 88 axes to determine the expected engine power data required in response to the PFCS 22 such that the EECU 76 receives this data before the flight commands communicated to the aircraft flight controls actually generate the resultant actual aircraft response. In other words, the EECU 76 effectively has "foresight" of the power required for the flight control commands and allows the EECU 76 to correctly accelerate or decelerate the engine to specifically tailor rotor speed to maintain the reference rotor speed for the soon to follow flight control commands (FIG. 5).

The engine power anticipation algorithm 72 utilizes outputs from the PFCS 22 and computes expected engine power required data therefrom to control the engine packages. Since the expected flight control commands are subject to "aerodynamic lag", aircraft response changes a fraction of a second after the expected engine power changes are made, at which point the engine control system has already received the new expected engine power required data and started making adjustments to the engine speed. That is, the engine control commands begin to take effect prior to the flight control commands.

The engine power anticipation algorithm 72 essentially merges parts of the flight control system model following algorithms with all necessary power required computations and provides to the engine future power required. In one non-limiting embodiment, an expected engine power required lead of approximately 0.3 seconds has been achieved. Applicant has implemented and tested the engine power anticipation algorithm 72 in a simulation environment and has shown substantial improvement in rotor speed control during aggressive maneuvering and autorotation entry/exit over conventional collective only anticipators. Unlike pure predictive anticipators, the engine power anticipation algorithm 72 need not use a neural network. Also, since this engine power anticipation algorithm 72 is deterministic, it is possible to certify the engine power anticipation algorithm 72 under DO-178B Level A which facilitates practicality for production programs.

The engine power anticipation algorithm 72 is applicable to all rotary-wing aircraft that utilize fly-by-wire technology. In fact, the heavier the machine, the greater the potential results as heavier rotary-wing aircraft tend to operate engines closer to maximum power with more time on maximum acceleration and deceleration schedules.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A flight control system comprising:
a first module configured to shape one or more flight control commands through model-following control logic of a fly-by-wire flight control system to provide a shaped flight control command; and
a second module configured to determine expected power required data for said shaped flight control command, said expected power required data utilized to perform at least one action to maintain a reference rotor speed.

2. The system as recited in claim 1, wherein said at least one action comprises control of a fuel flow to an engine through an electronic engine control unit.

3. The system as recited in claim 1, wherein said at least one action is initiated prior to application of said flight control command to an aircraft flight control.

4. The system as recited in claim 1, wherein said at least one action is initiated prior to generation of a resultant aircraft response.

5. The system as recited in claim 1, further comprising an engine module which performs said at least one action.

6. The system as recited in claim 5, wherein said at least one action comprises control of a fuel flow.

7. The system as recited in claim 1, wherein said one or more flight control commands is operative to modify at least a pitch axis of said aircraft.

8. The system as recited in claim 1, wherein said shaped flight control command is operative to modify at least a roll axis of said aircraft.

9. The system as recited in claim 1, wherein said shaped flight control command is operative to modify at least a yaw axis of said aircraft.

10. The system as recited in claim 1, wherein said shaped flight control command is operative to modify at least a lift axis of said aircraft.

11. The system as recited in claim 1, further comprising a power required aircraft model which shapes said expected power required data prior to said at least one action.

12. The system as recited in claim 1, further comprising a power required aircraft model which times said expected power required data prior to said at least one action.

13. The system as recited in claim 1, further comprising a power required aircraft model which shapes said expected power required data prior to effectuation of said at least one action in response to said one or more flight control commands.

14. The system as recited in claim 1, wherein said at least one action is initiated prior to a resultant aircraft response.

15. The system as recited in claim 1, wherein said model-following control logic of said fly-by-wire flight control system includes a command model and an inverse plant.

16. The system as recited in claim 15, wherein said second module utilizes an output of said command model and an output of said inverse plant to determine said expected power required data for a pitch axis, a roll axis, a yaw axis, and a collective axis.

17. The system as recited in claim 16, wherein said second module utilizes an output of said command model and said inverse plant to individually determine said expected power required data for said pitch axis, said roll axis, said yaw axis and said collective axis.

18. The system as recited in claim 17, wherein said second module includes a power required aircraft model that shapes and times said expected engine power required data for said pitch axis, said roll axis, said yaw axis and said collective axis to a specific aircraft type.

19. The system as recited in claim 15, wherein said command model and said inverse plant are part of a Primary Flight Control System (PFCS).

20. The system as recited in claim 1, wherein said second module includes a power required aircraft model that shapes and times said expected engine power required data for a pitch axis, a roll axis, a yaw axis, and a collective axis to a specific aircraft type.

21. The system as recited in claim 1, wherein expected power required data is individually determined for a pitch axis, a roll axis, a yaw axis, and a collective axis.

22. A method of engine anticipation for a rotary-wing aircraft comprising:
shaping a flight control command through model-following control logic of a fly-by-wire flight control system to provide a shaped flight control command;
determining an expected power required data in response to the shaped flight control command for a pitch axis, a roll axis, a yaw axis and a collective axis; and
utilizing the expected power required data to perform at least one action to maintain a reference rotor speed.

23. A method as recited in claim 22, further comprising:
generating an aircraft response with the shaped flight control command; and
initiating the at least one action prior to generation of the aircraft response with the shaped flight control command.

24. An aircraft comprising:
an engine;
an aircraft flight control;
a fly-by-wire flight control system with model-following control logic to shape a flight control command from said aircraft flight control to provide a shaped flight control command; and
a module which determines an expected power required data in response to the flight control command, said expected power required data determined for a pitch axis, a roll axis, a yaw axis and a collective axis to perform at least one action to control an engine speed of said engine and maintain a reference rotor speed.

25. The aircraft as recited in claim 24, wherein said at least one action is initiated prior to said flight control command generate a resultant aircraft response.

* * * * *